Jan 6, 1931.  S. A. SOLLIE  1,787,647
CONTROL OF LIGHT RAYS
Filed Nov. 2, 1927   2 Sheets-Sheet 1
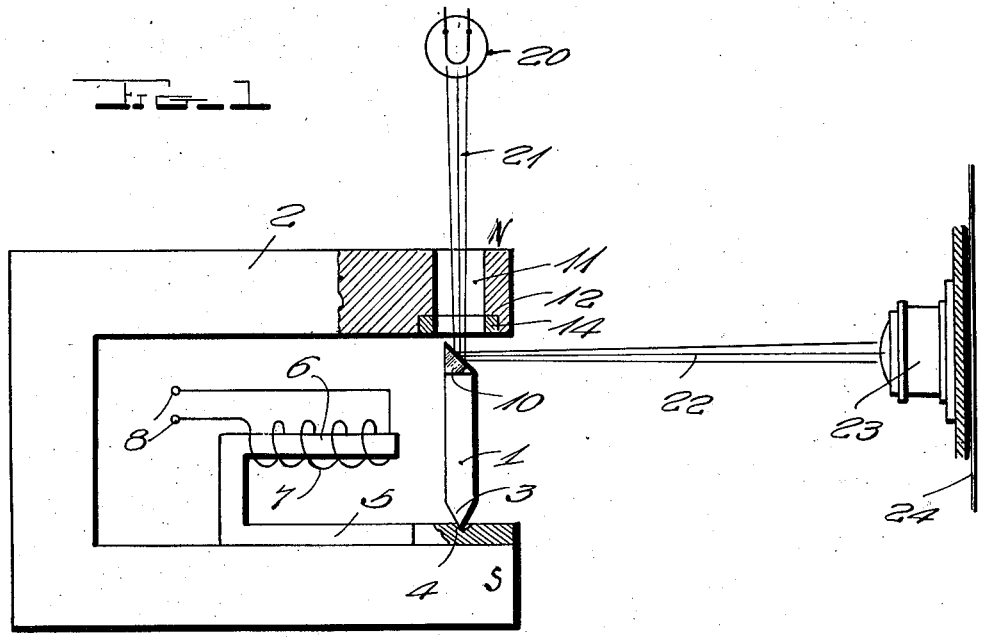
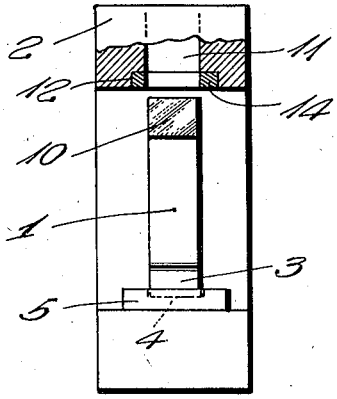
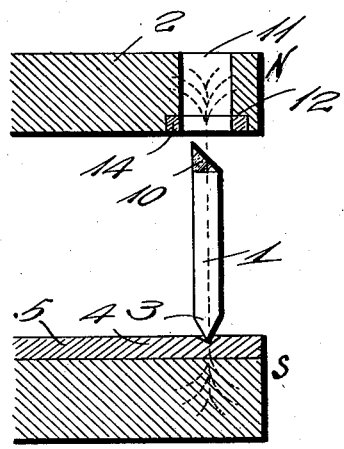
INVENTOR.
Sigurd A. Sollie,
BY John O. Brady
ATTORNEY.

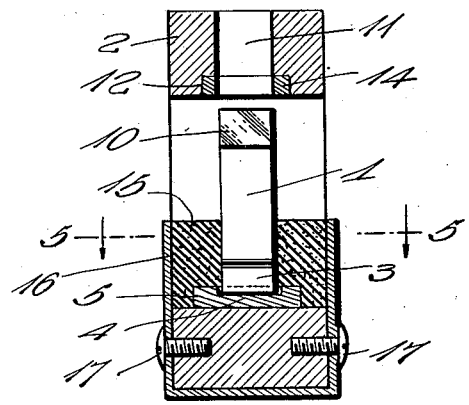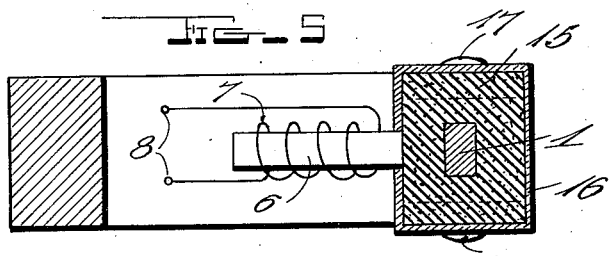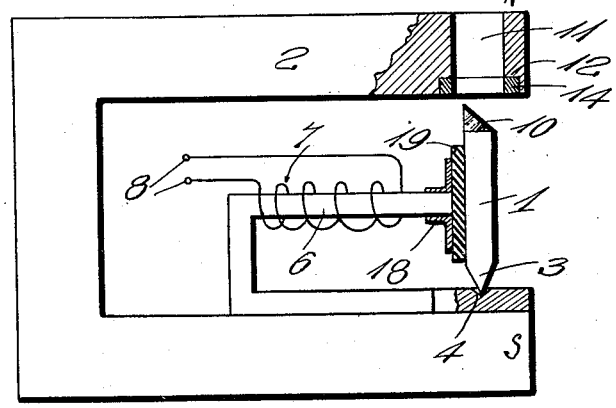

Patented Jan. 6, 1931

1,787,647

UNITED STATES PATENT OFFICE

SIGURD A. SOLLIE, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

CONTROL OF LIGHT RAYS

Application filed November 2, 1927. Serial No. 230,678.

My invention relates broadly to a system of control for light rays and more particularly to an electromagnetic device for variably controlling the position of a beam of light.

One of the objects of my invention is to provide means for controlling light rays in the making of talking or musical film used in the art of motion pictures, where the light control system is operative substantially without inertia for variably controlling a beam of light in accordance with current changes in an electromagnetic system.

Another object of my invention is to provide an apparatus for variably controlling the position of a beam of light in accordance with current changes through an electromagnetic device where the device is substantially aperiodic in its operation.

A further object of my invention is to provide an apparatus for variably controlling the position of light rays in accordance with variable current in an electrical control circuit, wherein a member is normally suspended in a vertical position under the influence of magnetic lines of force and variable in its position for reflecting a beam of light directed thereon by current changes in an electromagnetic system adjacent the device.

A still further object of my invention resides in the arrangement of an electromagnetic control system in which an armature member carrying a mirror or prism is normally suspended in a vertical position under the influence of a permanent magnetic field, and the position thereof, changed under the influence of current variations in an electromagnetic device for variably controlling the position of a beam of light directed from the mirror or prism.

My invention will be more fully understood from the specification hereinafter following by reference to the accompanying drawings, in which:

Figure 1 is a side elevation showing the arrangement of parts constituting the light control device of my invention; Fig. 2 is an end view of the light control device illustrated in Fig. 1; Fig. 3 is a fragmentary view showing the distribution of magnetic lines of force through the armature member for effecting a suspension of the armature member in a normally vertical position; Fig. 4 is a modified view of the light control device showing one method which I may employ for cushioning the armature member in the light control device; Fig. 5 is a plan view showing the arrangement of sponge rubber cushion around the lower portion of the armature member of the light control device on line 5—5 of Fig. 4; and Fig. 6 shows a further modification of the light control device and the manner in which the armature may be cushioned with respect to the pole member of the electromagnetic control device.

The light control apparatus of my invention has a wide variety of applications, among which I may mention the photographic recording of telegraph signals on film and the making of talking or musical films in the art of talking motion pictures. I have devised a light control system which is substantially aperiodic so that the effect of light upon a film will be equally efficient at all audible frequencies. The light control apparatus is particularly effective over a range of variable voice and musical frequencies by reason of the method of suspension of an armature member under the influence of magnetic lines of force variable in position by the effect of change in the magnetic condition of a magnetic control device located adjacent the armature member. Slight changes in amplitude of the current through the control device operate to shift the armature member for variably controlling the position of a beam of light. The armature member in the light control device of my invention is normally erected and maintained in a vertical position by the passage of magnetic lines of force therethrough. The mounting of the armature is such that the normal magnetic attraction between one end of the armature and the magnetic system serves to suspend the armature in a selected position for movement with substantially no inertia under the influence of a variable magnetic field. In order that the armature may receive the required damping, an eddy current ring is positioned adjacent one end of the armature and serves to steady or maintain the alignment of the armature with respect to the permanent magnet system.

Referring to the drawings in more detail, reference character 1 designates the armature member of the light control device which is suspended between the poles of a permanent magnet 2. The lower end of the armature is provided with a knife edge 3 fitted into a recess 4 in the pole member 5 of the electromagnetic control device 6. The electromagnetic control device 6 includes a winding 7, the terminals of which are represented at 8 and extend to the output circuit of a control system such as the output of an audio frequency electron tube amplifier. The magnetic lines of force which extend from the north pole of permanent magnet system 2 to the south pole thereof pass through an armature 1 as represented more clearly in Fig. 3 and serve to suspend the armature 1 in a normally vertical position by reason of the attraction of the magnetic armature 1 at its pivotal point 3 in the groove 4. The armature 1 carries a prism or mirror 10 on the top thereof in alignment with an aperture 11 formed in the north pole of permanent magnetic system 2. The aperture 11 is recessed as represented at 12 to receive a ring member 14. The ring member 14 may be of copper, brass or aluminum, which is set into the pole face of the permanent magnet 2 in such position as to normally surround the upper end of the armature 1 and produce eddy currents for damping the motion of the armature. In order that the motion of the armature may be confined to the required limits and in only one direction, I may provide a rubber damper 15 for the armature 1 which is held in position by means of box-like member 16 which is mounted as represented at 17 from the south pole of the permanent magnet system 2. I may also provide damping means for the armature as represented at Fig. 6 wherein a cap member 18 is fitted over the pole piece 6 and carries a rubber damper 19 against which armature 1 may cushion. In this manner the vibration of the armature may be controlled within sufficient limits to permit reflection of the light from a suitable source 20 directed in a beam 21 through aperture 11 from the surface of the prism or mirror 10 to the position represented at 22, and through a suitable lens system 23 upon a film 24.

The armature 1 is normally maintained and suspended in a vertical position by the passage of magnetic lines of force through the armature from the north to the south pole of the permanent magnet system 2. A change in the magnetic conditions of the electromagnetic system 6 causes armature 1 to oscillate and change the direction of the light rays for effecting the required record upon a film.

While I have described my invention in certain of its preferred embodiments, I desire that it be understood that modifications may be made and that no limitations upon my invention are intended other than those imposed by the scope of the appended claims.

What I claim as new and desire to secure by Letters Patent of the United States is as follows:

1. In a system for controlling light rays, a pair of vertically aligned magnetic poles, an armature member erected upon one of said poles and maintained in a vertical position between said poles by magnetic lines of force threading said armature, a ring member mounted adjacent the upper extremity of said armature member for establishing a magnetic field of force surrounding the lines of force which thread said armature member, a light reflecting surface carried by said armature member, a source of light rays incident upon said light reflecting surface, said light reflecting surface being shiftable in position in accordance with movement imparted to said armature member.

2. In a system for controlling light rays, a pair of poles of opposite polarity vertically aligned with respect to each other, an armature member erected upon one of said poles and maintained in a vertical position between said poles by virtue of magnetic lines of force threading said armature member, an electromagnetic control device positioned adjacent said armature member for variably displacing said armature member with respect to the magnetic field threading said armature member, a source of directed light rays a light reflecting surface carried by the upper extremity of said armature member, one of said poles being apertured immediately above said light reflecting surface for the passage of light rays through said pole and upon said light reflecting surface, and an eddy current ring substantially surrounding the upper extremity of said armature for electrically damping the movement of said armature.

In testimony whereof I affix my signature.
SIGURD A. SOLLIE.